(12) United States Patent
Lee et al.

(10) Patent No.: US 12,123,491 B2
(45) Date of Patent: Oct. 22, 2024

(54) VEHICLE GEARSHIFT AUTONOMOUS CONTROL DEVICE AND METHOD THEREOF

(71) Applicant: INDUSTRIAL TECHNOLOGY RESEARCH INSTITUTE, Hsinchu (TW)

(72) Inventors: Shao-Yu Lee, Hsinchu County (TW); Zeng-Lung Huang, Hsinchu County (TW); Bing-Ren Chen, New Taipei (TW); Jia-Cheng Ke, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 18/111,360

(22) Filed: Feb. 17, 2023

(65) Prior Publication Data

US 2024/0151304 A1 May 9, 2024

(30) Foreign Application Priority Data

Nov. 3, 2022 (TW) .................................. 111141959

(51) Int. Cl.
*F16H 59/10* (2006.01)
*F16H 59/02* (2006.01)
(Continued)

(52) U.S. Cl.
CPC ......... *F16H 59/0204* (2013.01); *F16H 59/10* (2013.01); *G05D 1/0061* (2013.01); *F16H 2059/006* (2013.01)

(58) Field of Classification Search
CPC ....... F16H 2059/006; F16H 2059/0295; F16H 59/0204; G05D 1/0061
See application file for complete search history.

(56) References Cited

U.S. PATENT DOCUMENTS 4,712,640 A 12/1987 Leigh-Monstevens et al.
4,843,901 A 7/1989 Peterson et al.
(Continued)

FOREIGN PATENT DOCUMENTS

CN 102667259 A 9/2012
CN 102099603 B 11/2013
(Continued)

OTHER PUBLICATIONS

Matthias Lindner et al., Design of Highly Integrated Mechatronic Gear Selector Levers for Automotive Shift-by-Wire Systems, IEEE/ASME Transactions on Mechatronics 15, 6, 2010.
(Continued)

*Primary Examiner* — Charles A Fox
*Assistant Examiner* — Gregory T Prather
(74) *Attorney, Agent, or Firm* — Locke Lord LLP; Tim Tingkang Xia, Esq.

(57) ABSTRACT

A vehicle gearshift autonomous control device including a first actuator module, a second actuator module and an electronic control unit, is provided in an add-on manner to retrofit the vehicle transmission with both autonomous and human control gearshift functions. In an autonomous gearshift mode, the electronic control unit executes the vehicle gearshift autonomous control method and receives an autonomous gearshift command to drive the first actuator module to push a shift lever to implement a lateral shift selection, or to drive the second actuator module to spin a spin lever to implement a longitudinal gearshift. For vehicle security, whenever a vehicle gearshift autonomous control device failure or a human control gearshift intervention is detected in the autonomous gearshift mode, the electronic control unit shuts off the autonomous gearshift mode and switches to a human control gearshift mode to perform the human control gearshift function.

8 Claims, 11 Drawing Sheets

(51) Int. Cl.
   *G05D 1/00*   (2024.01)
   *F16H 59/00*  (2006.01)

(56) References Cited

U.S. PATENT DOCUMENTS

| | | | |
|---|---|---|---|
| 6,487,484 | B1 | 11/2002 | Shober et al. |
| 9,098,080 | B2 | 8/2015 | Norris et al. |
| 2018/0150074 | A1* | 5/2018 | Hashimoto ....... B60W 60/0053 |
| 2022/0325791 | A1* | 10/2022 | Soave .................... F16H 59/10 |

FOREIGN PATENT DOCUMENTS

| | | |
|---|---|---|
| CN | 105020382 A | 11/2015 |
| CN | 106560636 A | 4/2017 |
| CN | 109838545 B | 9/2020 |
| CN | 114060511 A | 2/2022 |
| JP | 2007331562 A | 12/2007 |
| TW | I408065 B | 9/2013 |
| TW | M503343 U | 6/2015 |

OTHER PUBLICATIONS

Andrew Turner et al., Direct-Drive Electromechanical Linear Actuator for Shift-by-Wire Control of an Automated Transmission, IEEE Vehicle Power and Propulsion Conference, 2006.

L. Glielmo et al., Gearshift Control for Automated Manual Transmissions, IEEE/ASME Transactions on Mechatronics, 11, 1, 2006.

Guido R. Guercioni et al., Gearshift Control for Hybrid Powertrains with AMTs, International Conference of Electrical and Electronic Technologies for Automotive, 2017.

Shusen Lin et al., Gearshift System Design for Automated Manual Transmission Based on an Electromagnetic Actuator, International Conference on Electrical and Control Engineering, 2011.

Dejan Matijevic et al., Modern Design and Control of Automatic Transmission and the Prospects of Development, Review Paper iipp, 2015.

Taiwan Patent Office, "Office Action", May 2, 2023, Taiwan.

* cited by examiner

VEHICLE GEARSHIFT AUTONOMOUS CONTROL DEVICE AND METHOD THEREOF

CROSS REFERENCE TO RELATED APPLICATION

This application claims the benefits of Taiwan application Serial No. 111141959, filed on Nov. 3, 2022, the disclosures of which are incorporated by references herein in its entirety.

TECHNICAL FIELD

The present disclosure relates in general to a vehicle control technology, and more particularly a technical means to equip a vehicle with actuator modules and electronic control means in an add-on manner, so as to retrofit a vehicle transmission to have the autonomous gearshift function and maintains the human control gearshift function. Thereupon, a vehicle gearshift autonomous control device and methods thereof is provided to resolve such problem. In the meantime, the human control gearshift function can be switched immediately to perform the human control gearshift for vehicle security while the vehicle gearshift autonomous control device has a failure or while a human control gearshift intervention has been detected in an autonomous gearshift mode.

BACKGROUND

When a traditional vehicle is retrofitted into an autonomous vehicle, it is necessary to make the traditional vehicle have a drive-by-wire chassis, including shift-by-wire for an autonomous gearshift control of a vehicle transmission to control vehicle speed.

However, it is expensive to retrofit the traditional vehicle to have a complete set of autonomous transmission system with shift-by-wire function provided by the original vehicle manufacturer. It is even more critical that no available autonomous transmission system specific to the target vehicle can be found in the marketplace.

In the prior related art, the major claims are that the vehicle transmission system can be controlled by a human control gearshift or by an autonomous gearshift, and involves mainly the art how to use electric control or human control to switch between the human control gearshift and the autonomous gearshift. However, it is not yet concerned to the vehicle security problem caused an autonomous gearshift device failure or a human control gearshift intervention while in an autonomous gearshift mode.

Accordingly, it is definitely a valuable subject to be studied by the persons in the related art to develop an "vehicle gearshift autonomous control device and methods thereof", and therefore a traditional vehicle transmission is equipped with an add-on autonomous gearshift device to have the autonomous gearshift function and maintain its human control gearshift function. Such art is used to retrofit a vehicle human control gearshift device to have an autonomous gearshift function; and provide a vehicle gearshift security function to switch immediately to perform the human control gearshift function while the autonomous gearshift device has a failure, or a human control gearshift has intervened while in an autonomous gearshift mode.

SUMMARY

In one embodiment of this disclosure, a vehicle gearshift autonomous control device, used with a shift lever device and a spin lever that are used for human control gearshift control of vehicle transmission, comprises:
 a first actuator module, combined with the shift lever device to form a lateral gearshift autonomous device, being to push a shift lever of the shift lever device in a first direction of the shift lever device to allow the shift lever device to execute a lateral shift selection;
 a second actuator module, combined with the spin lever of gearbox to form a longitudinal gearshift autonomous device, being to spin the spin lever to execute a longitudinal gearshift in a second direction of the shift lever device, the second direction and the first direction of the shift lever device being perpendicular to each other; and
 an electronic control unit, connected electrically with the first actuator module and the second actuator module, executing a vehicle gearshift autonomous control method; wherein, after an autonomous gearshift mode is chosen to actuate, the electronic control unit controls the first actuator module to push the shift lever to execute the lateral shift selection, or to control the second actuator module to spin the spin lever to execute the longitudinal gearshift; wherein, when a vehicle gearshift autonomous control device failure or a human control gearshift intervention is detected while in the autonomous gearshift mode, the autonomous gearshift mode is shut off and switched to a human control gearshift mode to perform a human control gearshift.

In the embodiment of this disclosure, a vehicle gearshift autonomous control method, performed by the electronic control unit of this disclosure, comprises the steps of:
 (a) activating the vehicle gearshift autonomous control device to preset in the human control gearshift mode; and
 (b) determining whether or not the vehicle gearshift autonomous control device is set in the autonomous gearshift mode; if positive, executing Step (c); and, if negative, executing Step (a);
 (c) executing the autonomous gearshift in the autonomous gearshift mode based on a vehicle current gear status and a gearshift command received; and
 (d) determining whether or not an autonomous gearshift function is normal; if positive, executing Step (e); and, if negative, executing Step (a);
 (e) returning to the home position of the first actuator module and the home position of the second actuator module so as to maintain the human control gearshift function; and
 (f) determining whether or not the human control gearshift intervention is detected while in the autonomous gearshift mode; if positive, executing Step (a); and, if negative, executing Step (b).

Further scope of applicability of the present embodiment will become more apparent from the detailed description given hereinafter. However, it should be understood that the detailed description and specific examples, while indicated in exemplary embodiments of the disclosure, are given by way of illustration only, since various changes and modifications from this detailed description within the spirit and scope of the disclosure will become apparent to those skilled in the art.

BRIEF DESCRIPTION OF THE DRAWINGS

The present disclosure will become more fully understood from the detailed description of the embodiment given herein below and the accompanying drawings which are given by way of illustration only, and thus are not limitative of the present disclosure and wherein.

DETAILED DESCRIPTION

Figure 1:
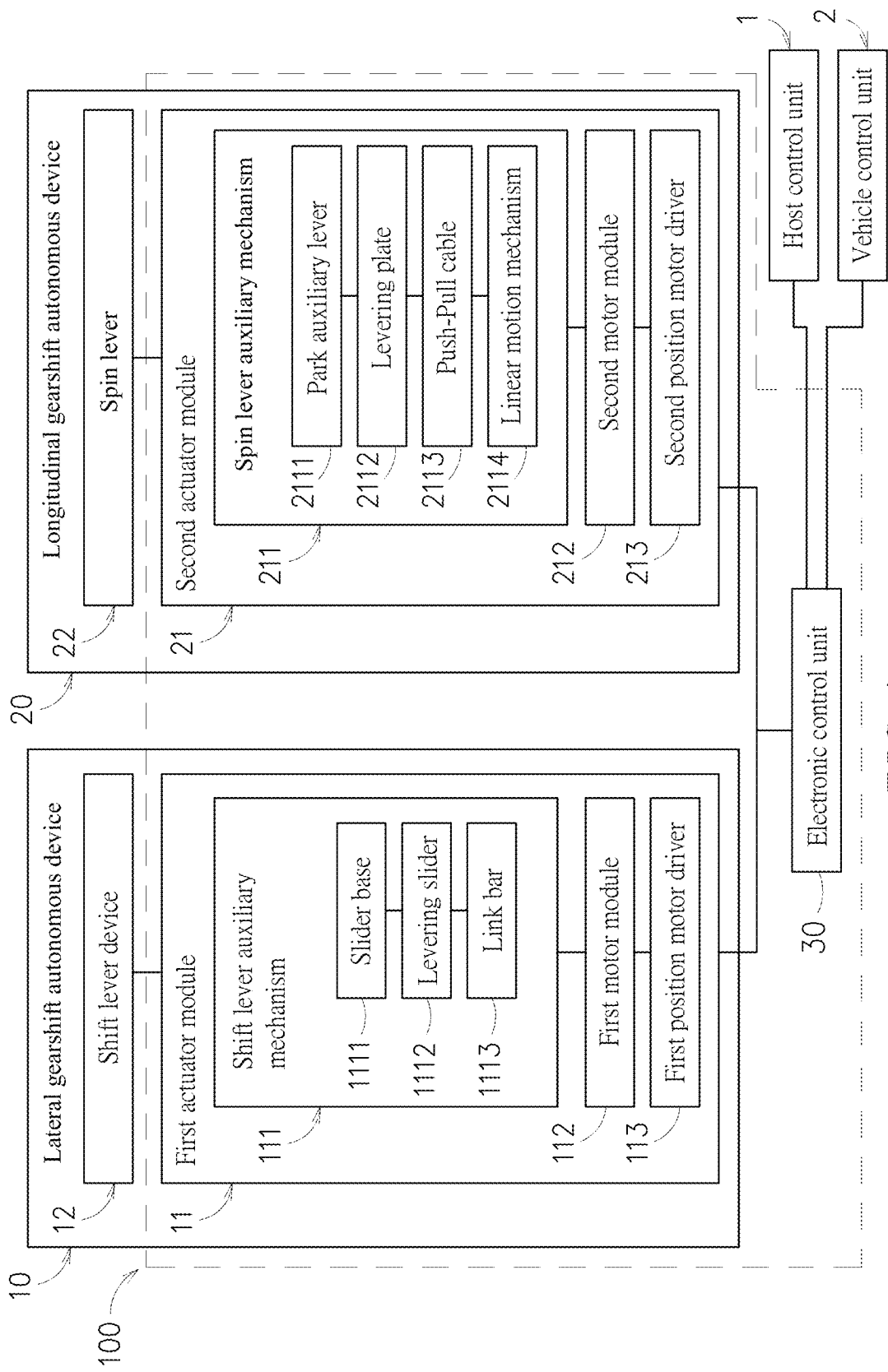
FIG. 1 is a schematic diagram of an embodiment of the vehicle gearshift autonomous control device in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
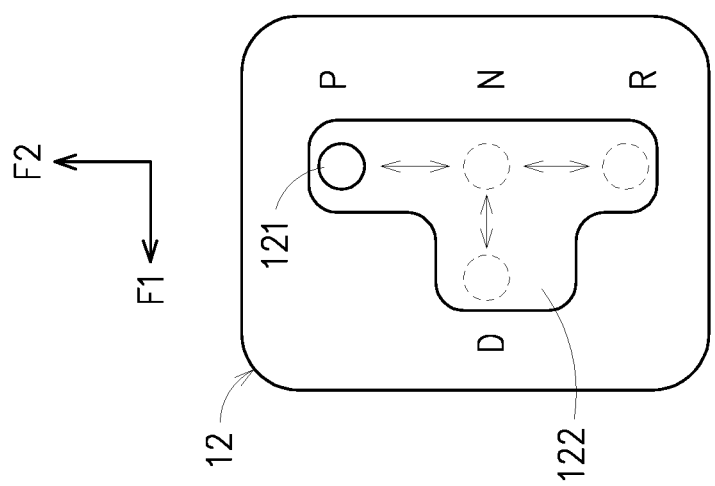
FIG. 2 is a schematic diagram of the shift lever device in an embodiment of FIG. 1.

Referring to FIG. 1 and FIG. 2, a vehicle gearshift autonomous control device 100 includes a first actuator module 11, a second actuator module 21 and an electronic control unit 30. Also, a lateral gearshift autonomous device 10 and a longitudinal gearshift autonomous device 20, all overlapping partly the vehicle gearshift autonomous control device 100, are schematically illustrated. All the modules and units described in this disclosure are printed circuit boards on which many electronic components deposed and firmware programmed to perform or execute the corresponding functions, The lateral gearshift autonomous device 10 is consisted of the first actuator module 11 and a shift lever device 12. The first actuator module 11 moves to push a shift lever 121 so as to execute a lateral shift selection in a first direction F1 of the shift lever device 12.

The longitudinal gearshift autonomous device 20 is consisted of the second actuator module 21 and a spin lever 22. The second actuator module 21 moves to spin the spin lever 22 so as to execute a longitudinal gearshift in the second direction F2 of the shift lever device 12. In this embodiment, the second direction F2 and the first direction F1 of the shift lever device 12 are perpendicular to each other.

The electronic control unit 30, connected electrically with the first actuator module 11 and the second actuator module 21 to perform an autonomous gearshift control in an autonomous gearshift mode, can actuate the lateral gearshift autonomous device 10 to execute a lateral shift selection, or the longitudinal gearshift autonomous device 20 to execute a longitudinal gearshift. When an abnormal autonomous gearshift function or a human control gearshift intervention is detected while in an autonomous gearshift mode, the electronic control unit 30 shuts off the autonomous gearshift mode and switches to the human control gearshift mode to perform the human control gearshift.

The electronic control unit 30 is connected electrically with a host control unit 1 and a vehicle control unit 2, in which the host control unit 1 is used to calculate and generate a gearshift command, and the vehicle control unit 2 is used to provide a current vehicle gear status.

Regarding the vehicle control unit 2, it is utilized to control integrally all the subsystems of the vehicle thru a vehicle control network, and receives a current vehicle gear status transmitted in the vehicle control network. This current vehicle gear status received is consistent with the corresponding shift position of the shift lever device for a vehicle transmission human control gearshift control.

It shall be explained that, in this disclosure, lateral and longitudinal directions are perpendicular to each other, and parallel to the first direction F1 and the second direction F2 of the shift lever device, respectively; Namely, the lateral gearshift autonomous device 10 and the longitudinal gearshift autonomous device 20 are individually to implement the lateral shift selection and longitudinal gearshift in two direction mutually perpendicular.

In the embodiment shown in FIG. 2, the lateral shift selection is consisted of an N shift (neutral shift) and a D shift (drive shift), and the longitudinal gearshift is consisted of a P shift (park shift), an N shift (neutral shift) and an R shift (reverse shift); but not limited thereto. In the art, there are a variety of shift layouts in the shift lever devices for vehicle transmission gearshift arrangement, but shift layouts are mainly limited to bidirectional layout arrangements with directions perpendicular to each other. In particular, in this embodiment, the lateral gearshift autonomous device 10 and the longitudinal gearshift autonomous device 20 are individually to perform the gearshift in the first direction F1 and the second direction F2, respectively.

Figure 3:
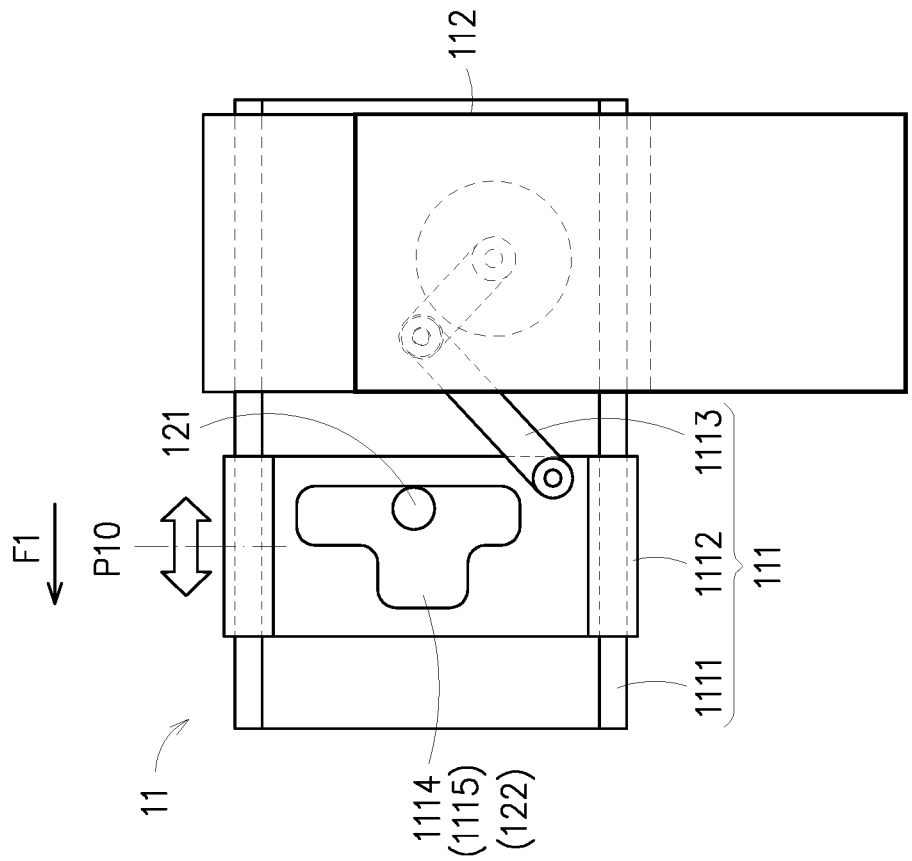
FIG. 3 is a schematic diagram of the first actuator module in an embodiment of FIG. 1.
Figures 3A, 3B:
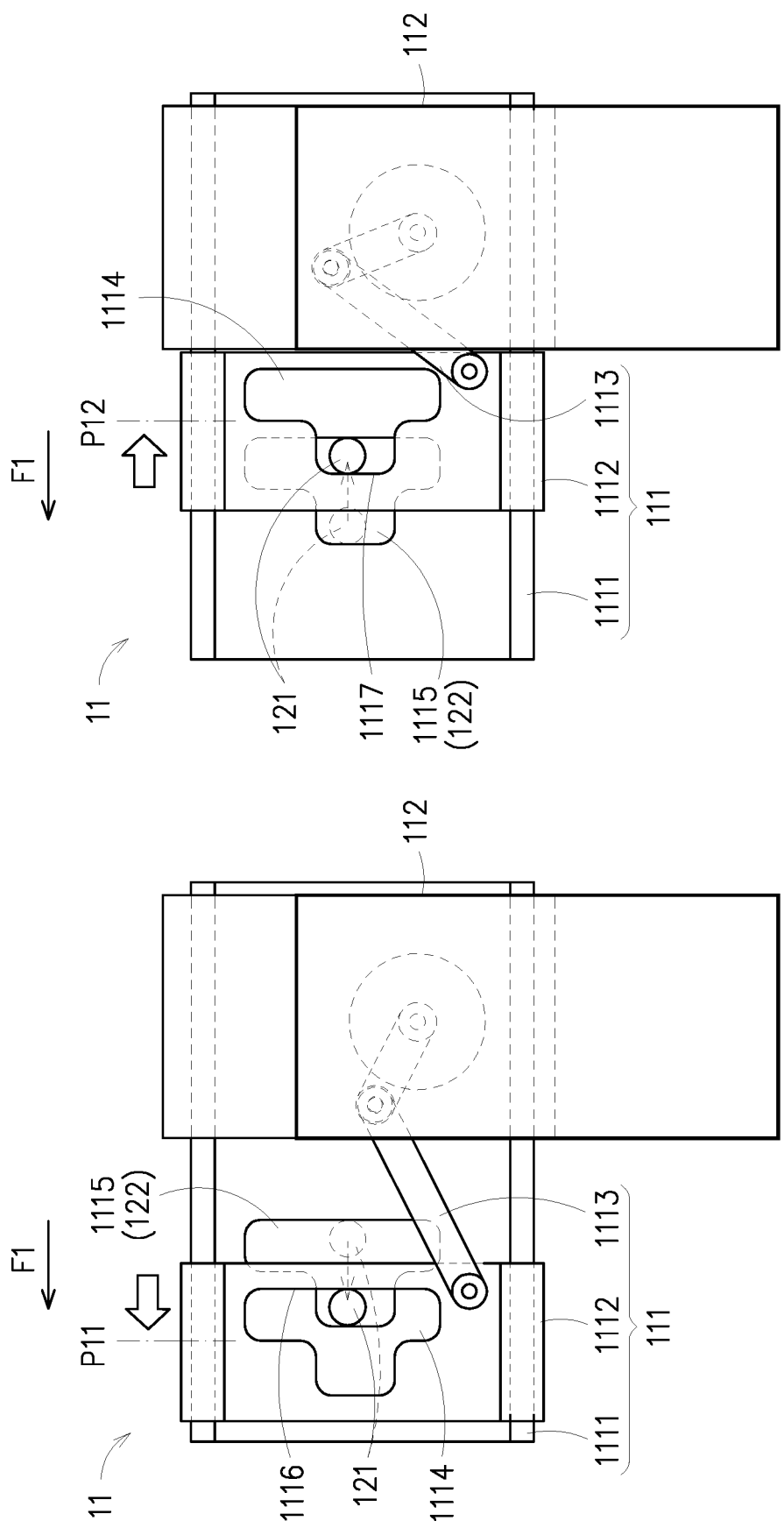
FIG. 3A and FIG. 3B are a schematic diagrams of action in an embodiment of FIG. 3.

Referring to FIG. 1 to FIG. 3, FIG. 3A and FIG. 3B, wherein FIG. 3 is a schematic diagram of the first actuator module in an embodiment of FIG. 1, and a first position motor driver 113 is not shown in FIG. 3, FIG. 3A or FIG. 3B.

The first actuator module 11 includes a shift lever auxiliary mechanism 111, a first motor module 112 and a first position motor driver 113. The first actuator module 11 is assembled with the shift lever device 12. The first motor module 112, combined with the shift lever auxiliary mechanism 111, move linearly the shift lever auxiliary mechanism 111 to push the shift lever 121 to undergo the lateral shift selection.

It shall be explained that the shift lever device used for this disclosure is not limited to a gearshift device capable of the lateral shift selection and the longitudinal gearshift. The configuration of the shift lever device 12 described above is simply one exemplary embodiments.

The first motor module 112 is connected electrically with a first position motor driver 113. The electronic control unit 30 is connected electrically with the first position motor driver 113 to control the first motor module 112 to move linearly the shift lever auxiliary mechanism 111 to a located position.

The shift lever auxiliary mechanism 111 includes a slider base 1111, a levering slider 1112 and a link bar 1113. The levering slider 1112 is disposed on the slider base 1111. The link bar 1113 is connected between the levering slider 1112 and the first motor module 112. The first motor module 112 drives the link bar 1113 to slide the levering slider 1112 linearly along the slider base 1111, such that the shift lever 121 can be pushed to perform the lateral shift selection between N shift and D shift as shown in FIG. 2.

The levering slider 1112 has a levering slider opening 1114, and the slider base 1111 has a slider base opening 1115. As shown in the embodiment of FIG. 3, the levering slider opening 1114 and the slider base opening 1115 are corresponding to the shift lever slot 122 of the shift lever device 12 in shape and size. The levering slider opening 1114 slides to overlap and align completely with the slider base opening 1115 and the shift lever slot 122 in order to have not any interference to the shift lever 121 to execute a gearshift within the shift lever slot 122.

The shift lever auxiliary mechanism 111 is assembled on the shift lever device 12 as shown in FIG. 2 and FIG. 3, and arranges the slider base opening 1115 of the slider base 1111 to overlap and align with the shift lever slot 122 of the shift lever device 12, without interfering the manual gearshift of the shift lever 121. The shift lever 121 is disposed within the slider base opening 1115 of the slider base 1111 and the levering slider opening 1114 of the levering slider 1112, and extends out of the levering slider 1112. The first motor module 112 drives the link bar 1113 to slide the levering slider 1112 to reach a position where the levering slider opening 1114 overlays and aligns with the slider base opening 1115 of the slider base 1111, such that the shift lever 121 can perform the manual gearshift without any interference from the levering slider 1112. Then, this instant position of the levering slider 1112 can be set and stored as the first actuator module home position P10. Namely, as the first actuator module 11 returns to the home position P10, then the manual gearshift can maintain to be performed.

As shown in FIG. 3A, as the first position motor driver 113 (Not labeled) controls the first motor module 112 to drive the link bar 1113 to slide the levering slider 1112 along the slider base 1111 linearly from the first actuator module home position P10 to a first lateral shift selection position P11. While in this movement, a right inner edge 1116 of the levering slider opening 1114 would push the shift lever 121 to gearshift, such that the shift lever 121 would make a lateral shift selection from N shift to D shift. This first lateral shift selection position P11 is set and stored as the position that the first actuator module would be located to gearshift from N shift to D shift of the shift lever device 12.

As shown in FIG. 3B, as the first position motor driver 113 (Not labeled) controls the first motor module 112 to drive the link bar 1113 to slide the levering slider 1112 along the slider base 1111 linearly from the first actuator module home position P10 to a second lateral shift selection position P12. While in this movement, a left inner edge 1117 of the levering slider opening 1114 would push the shift lever 121 to gearshift, such that the shift lever 121 would make a lateral shift selection from D shift to N shift. This second lateral shift selection position P12 is set and stored as the position that the first actuator module would be located to gearshift from D shift to N shift of the shift lever device 12.

Wherein, the first actuator module 11 can be located and moved to the positions for lateral gearshift, then pushes the shift lever 121 to perform the lateral shift selection between N shift and D shift of the shift lever device 12.

As described above, the slider base opening 1115 of the slider base 1111 is assembled to overlap and align with the shift lever slot 122 of the shift lever device 12, and the size and shape of the slider base opening 1115 of the slider base 1111 must be determined in order not to have any interference for the gearshift operation of the shift lever 121.

Figure 4:
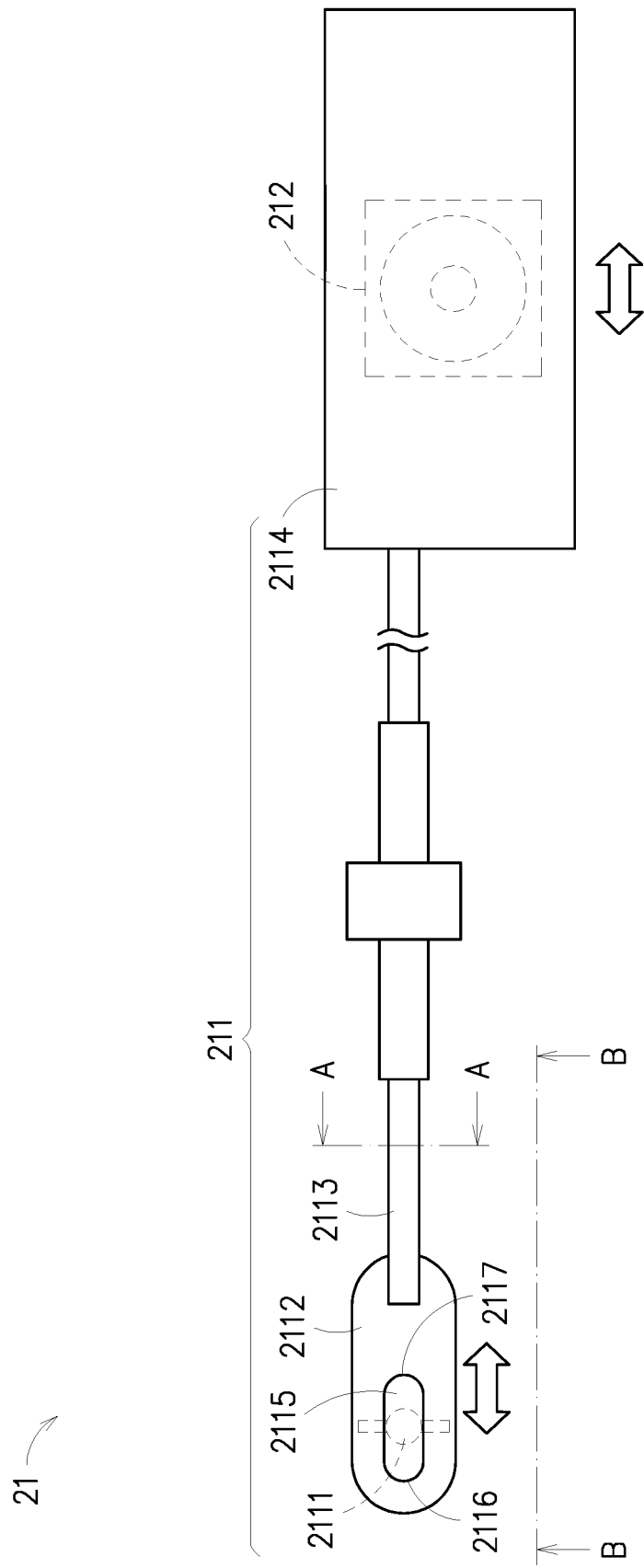
FIG. 4 is a schematic diagram of the second actuator module in an embodiment of FIG. 1.

Refer to FIG. 1, FIG. 2, FIG. 4, FIG. 4A and FIG. 4B, wherein FIG. 4 is a schematic diagram of an embodiment of the second actuator module 21 of FIG. 1 to demonstrate schematically the combination among a park auxiliary lever 2111, a levering plate 2112, a push-pull cable 2113, a linear motion mechanism 2114, a second motor module 212 and a second position motor driver 213 (not labeled in the figure). Also, FIG. 4A and FIG. 4B demonstrate schematically the combination of a spin lever 22, the park auxiliary lever 2111, the levering plate 2112 and the push-pull cable 2113.

The second actuator module 21 includes a spin lever auxiliary mechanism 211, a second motor module 212 and a second position motor driver 213. The park lever auxiliary mechanism 211 is assembled with the spin lever 22 of the gearbox 23. The second motor module 212 is combined with a linear motion mechanism 2114 of the spin lever auxiliary mechanism 211 to drive the spin lever auxiliary mechanism 211 to spin the spin lever 22 so as to perform the longitudinal gearshift among P shift, N shift and R shift shown as FIG. 2.

The second motor module 212 is connected electrically with a second position motor driver 213. The electronic control unit 30 is connected electrically with the second position motor driver 213 so as to control the second position motor driver 213 to drive the second motor module 212 to move the spin lever auxiliary mechanism 211 to a located position.

The spin lever auxiliary mechanism 211 includes a park auxiliary lever 2111, a levering plate 2112, a push-pull cable 2113 and a linear motion mechanism 2114. The park auxiliary lever 2111 is attached with the spin lever 22 and is used to be levered by the levering plate 2112 to spin the spin lever 22. The levering plate 2112, interacting with the park auxiliary lever 2111, is moved to lever the park auxiliary lever 2111. The push-pull cable 2113, connected between the levering plate 2112 and the linear motion mechanism 2114, is introduced to extend the linear motion mechanism 2114 to be mounted in a proper space of the vehicle. The linear motion mechanism 2114 is driven by the second motor module 212 to move the levering plate 2112 via the push-pull cable 2113.

Figure 4B:
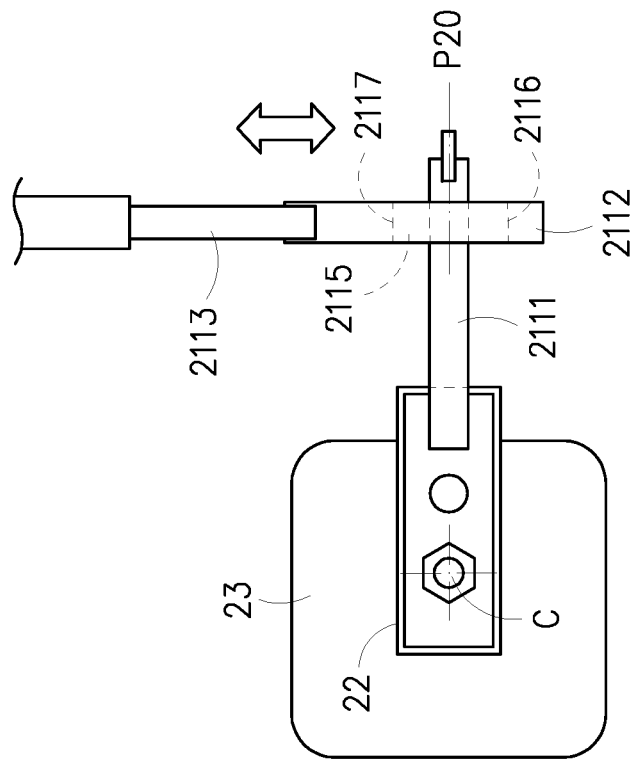
FIG. 4B is a schematic diagram from view B-B in an embodiment of FIG. 4.
Figure 4A:
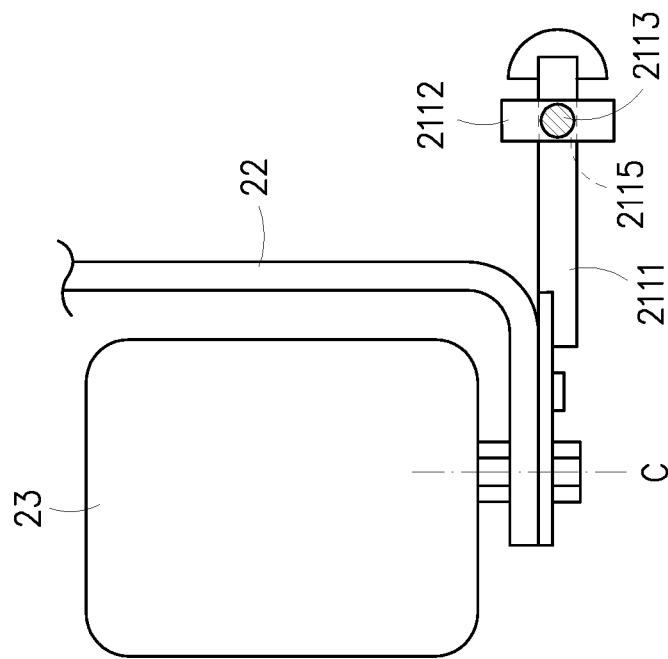
FIG. 4A is a schematic diagram from view A-A in an embodiment of FIG. 4.

As shown in FIG. 4, GIG. 4A and FIG. 4B, the levering plate 2112 has a levering plate slot 2115 and the end of the park auxiliary lever 2111 is disposed perpendicularly inside the levering plate slot 2115 to be levered by the levering plate 2112. A length of the levering plate slot 2115 can be the sliding stroke that the end of the park auxiliary lever 2111 slides in the levering plate slot 2115 while performing a human control gearshift.

As shown in FIG. 4B, the levering plate 2112 is located at a position and the human control gearshift is performed to spin the spin lever 22 to make the park auxiliary lever 2111 slide in the levering plate slot 2115 without any interference. Then, the located position of the levering plate 2112 is stored as the second actuator module home position P20. Namely, while the second actuator module 21 returns to the home position P20, then the human control gearshift can maintain to be performed.

Figure 5B:
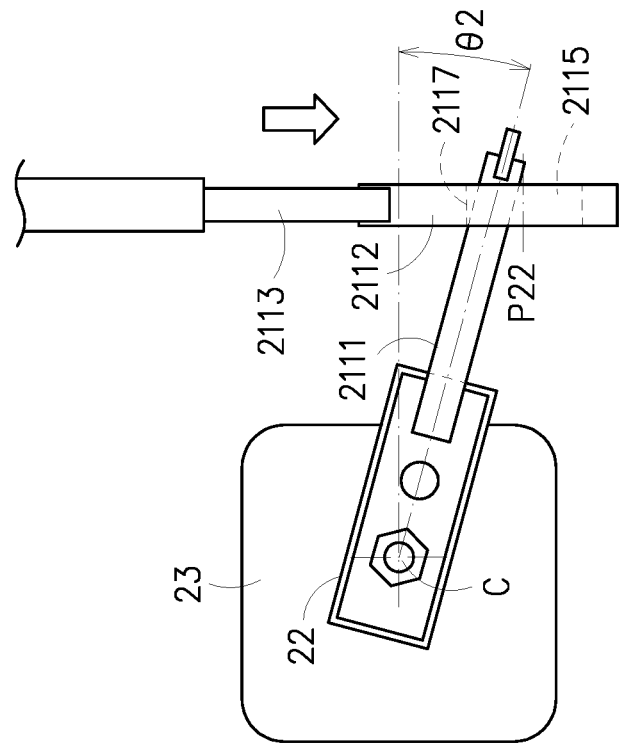
FIG. 5A and FIG. 5B are schematic diagrams of action in an embodiment of FIG. 4.
Figure 5A:
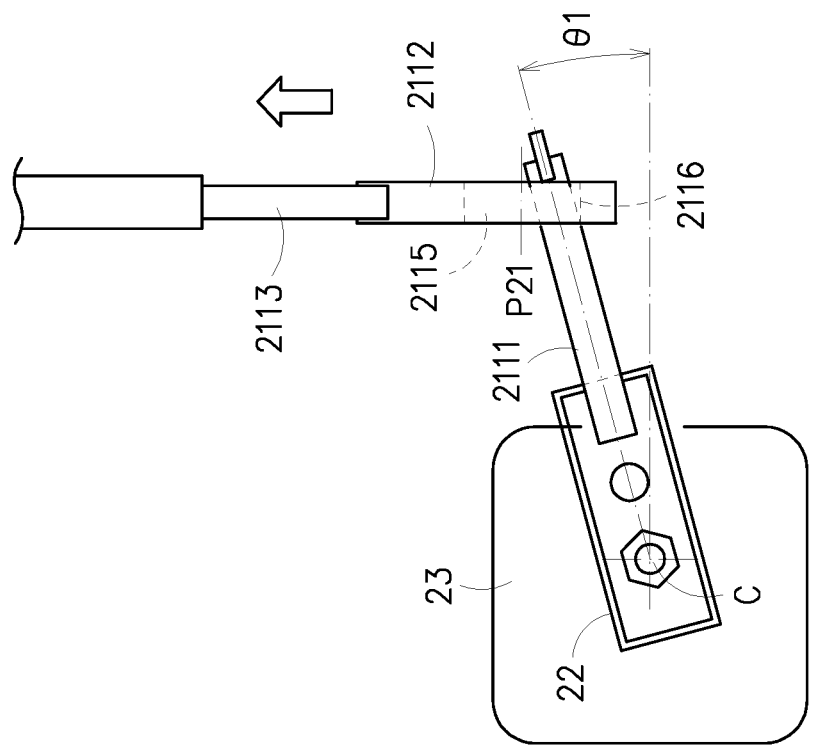

Referring to FIG. 4 and FIG. 5A, the second motor module 212 drives the linear motion mechanism 2114, so as to move the push-pull cable 2113 and the levering plate 2112 linearly from the second actuator module home position P20 to the first longitudinal gearshift position P21. While in this movement, a front-end inner edge 2116 of the levering plate slot 2115 is used to pull the park auxiliary lever 2111 so as to lever the spin lever 22 to spin about a park gear shaft C by a first angle θ1 and implement an N-gear to P-gear gearshift. Due to such a movement, referring also to FIG. 2, the shift lever 121, linked with the lever the spin lever 22, can be moved from the N shift position to the P shift position in the shift lever device 12. This first longitudinal gearshift position P21 can be set and stored as the located position for the second actuator module to execute a gearshift from the N shift to the P shift. Similarly, the located position of the second actuator module for the gearshift from the P shift to the N shift can be set and stored. These are the located position settings for the adjacent gearshift of N shift and P shift.

Referring to FIG. 4 and FIG. 5B, the second motor module 212 drives the linear motion mechanism 2114, so as to move the push-pull cable 2113 and the levering plate 2112 linearly from the second actuator module home position P20 to the second longitudinal gearshift position P22. While in this movement, a rear-end inner edge 2117 of the levering plate slot 2115 is used to push the park auxiliary lever 2111 so as to lever the spin lever 22 to spin about a park gear shaft C by a second angle θ2 and implement an N-gear to R-gear gearshift. Due to such a movement, referring also to FIG. 2, the shift lever 121, linked with lever the park lever 22, can be moved from the N shift position to the R shift position in the shift lever device 12. This second longitudinal gearshift position P22 can be set and stored as the located position for the second actuator module to execute a gearshift from the N shift to the R shift. Similarly, the located position of the second actuator module for the gearshift from the R shift to the N shift can be set and stored. These are the located position settings for the adjacent gearshift of N shift and R shift.

The second actuator module 21 is driven to move to the located position that is set and stored for each corresponding adjacent gearshift, then the shift lever 121 can be shifted sequentially to perform the longitudinal gearshift with respect to the P shift, the N shift and the R shift of the shift lever device 12 shown as FIG. 2.

Figure 6:
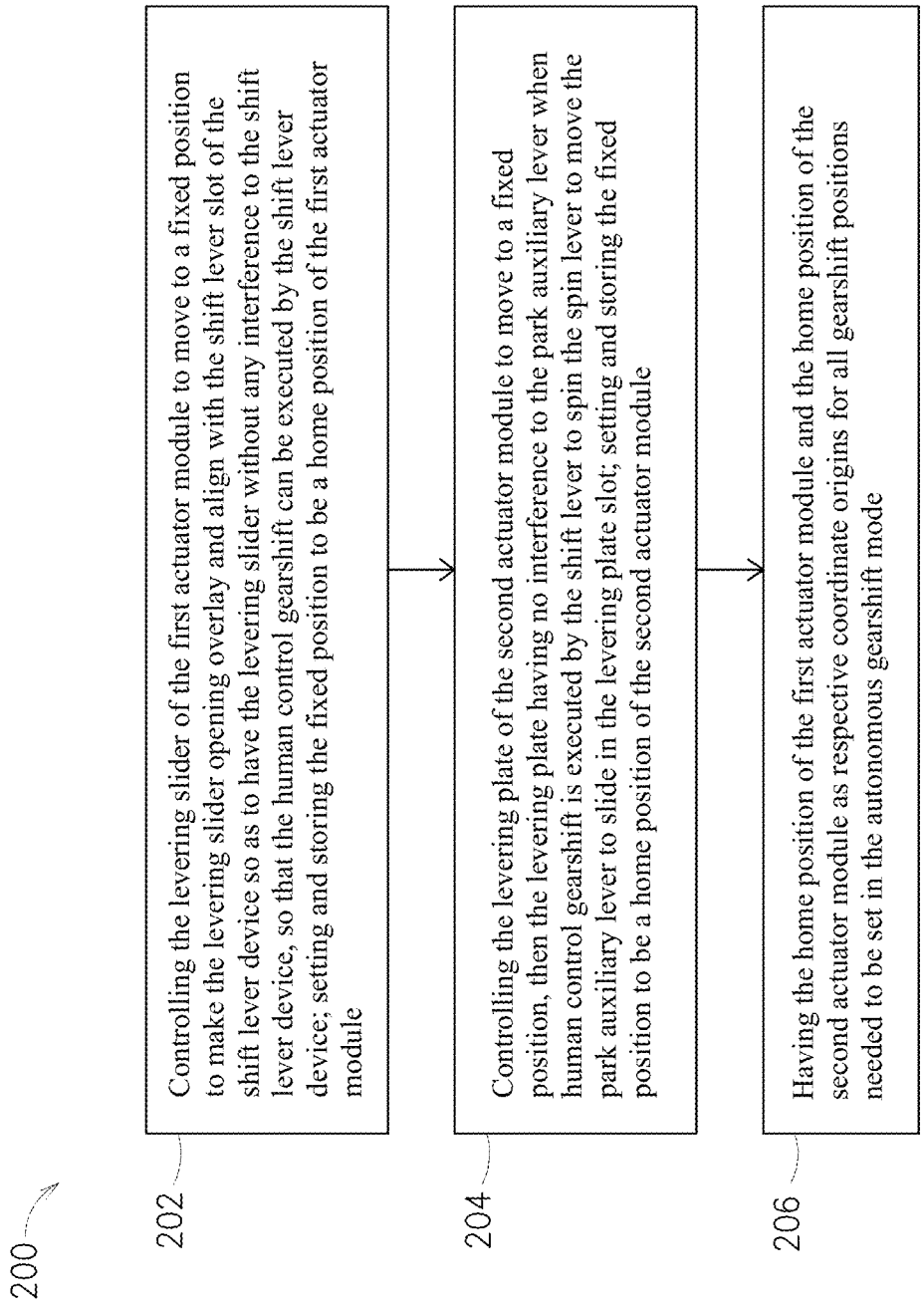
FIG. 6 is a flowchart diagram of home position setting for the first actuator module and the second actuator module in accordance with this disclosure.

Referring to FIG. 6, according to the aforesaid descriptions, a setting process 200 of the first actuator module home position P10 and the second actuator module home position P20 can be listed and includes the steps as follow.

Step 202: Controlling the levering slider 1112 of the first actuator module 11 to move to a fixed position to make the levering slider opening 1114 overlay and align with the shift lever slot 122 of the shift lever device 12 so as to have the levering slider 1112 without any interference to the shift lever device 12, so that the human control gearshift can be executed by the shift lever device 12. This fixed position is set and stored as the first actuator module home position P10.

Step 204: Controlling the levering plate 2112 of the second actuator module 21 to a fixed position, then the levering plate 2112 having no interference to the park auxiliary lever 2111 when the human control gearshift is executed by the shift lever 121 to spin the spin lever 22 to move the park auxiliary lever 2111 to slide in the levering plate slot 2112. This fixed position is set and stored as the second actuator module home position P20.

Step 206: Having the home position of the first actuator module P10 and the home position of the second actuator module P20 as respective coordinate origins for all gearshift positions needed to be set in the autonomous gearshift mode.

In the foregoing process, sequence of Step 202 and Step 204 can be exchanged. Namely, Step 204 can be performed firstly to obtain the home position of the second actuator module P20, and then Step 202 is performed to obtain the home position of the first actuator module P10.

It shall be explained that the shift lever device 12 and park lever 22 aforementioned are the parts of the human control gearshift control mechanism of conventional vehicle transmission, and it is the specific technology features in this disclosure that the shift lever device 12 and the park lever 22 are combined with the vehicle gearshift autonomous control device 100 in an add-on manner, so as to be retrofitted to be a lateral gearshift autonomous device 10 and a longitudinal gearshift autonomous device 20 and controlled by the electronic control unit 30 to implement the autonomous gearshift.

Figure 7:
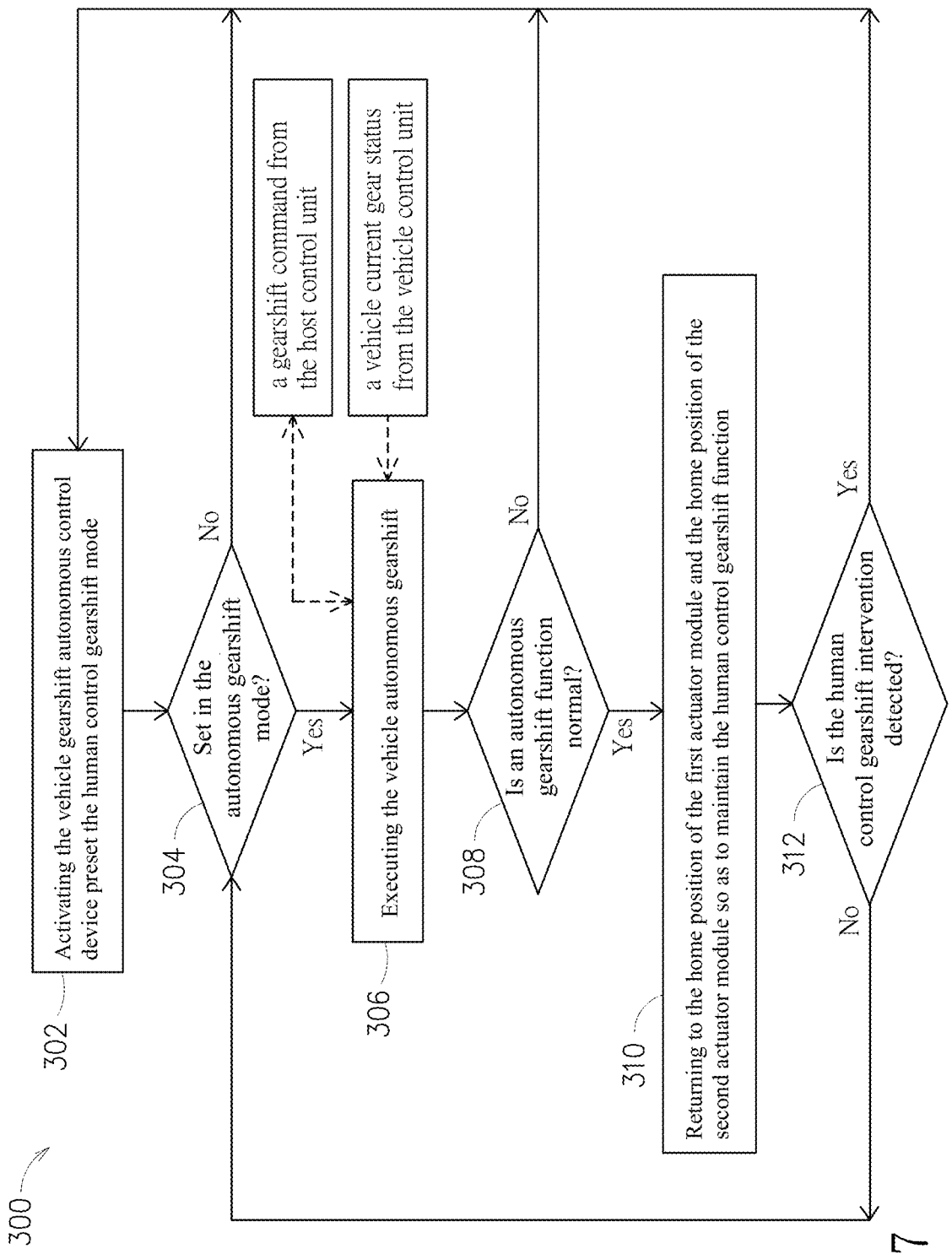
FIG. 7 is a flowchart diagram of an embodiment of the vehicle gearshift autonomous control method in accordance with this disclosure.

Refer to FIG. 1 and FIG. 7, wherein FIG. 7 is a process 300 flowchart of the vehicle gearshift autonomous control method in accordance with this disclosure. This control method is performed by the electronic control unit 30 of the vehicle gearshift autonomous control device 100 shown in FIG. 1, and includes the steps as follow.

Step 302: Activating the vehicle gearshift autonomous control device 100 to preset in the human control gearshift mode; and Step 304: Determining whether or not the vehicle gearshift autonomous control device 100 is set in an autonomous gearshift mode; if positive, execute Step 306; and, if negative, execute Step 302.

Step 306: Executing the vehicle autonomous gearshift in the autonomous gearshift mode based on the gearshift command from the host control unit 1 and the vehicle current gear status from the vehicle control unit 2.

Step 308: Determining whether or not an autonomous gearshift function is normal; if positive, executing Step 310; and, if negative, executing Step 302.

Step 310: Returning to the home position of the first actuator module P10 and the home position of the second actuator module P20 so as to maintain the human control gearshift function; and Step 312: Determining whether or not the human control gearshift intervention is detected while in the autonomous gearshift mode; if positive, executing Step 302; and, if negative, executing Step 304.

In this disclosure, the process 300 of the vehicle gearshift autonomous control method is performed by the electronic control unit 30 of the vehicle gearshift autonomous control device 100, the autonomous gearshift is executed in accordance with the gearshift command, and it is determined whether or not the autonomous gearshift function is normal. If there is an abnormality, then switch to the human control gearshift mode and the human control gearshift can be performed. Otherwise, after an autonomous gearshift is finished, the first actuator module and the second actuator module would return to the respective home position for maintaining the human control gearshift function, then determine whether or not a human control gearshift intervention is involved. If a human control gearshift intervention is true, then switch to the human control gearshift mode and the human control gearshift can be performed.

Figure 8:
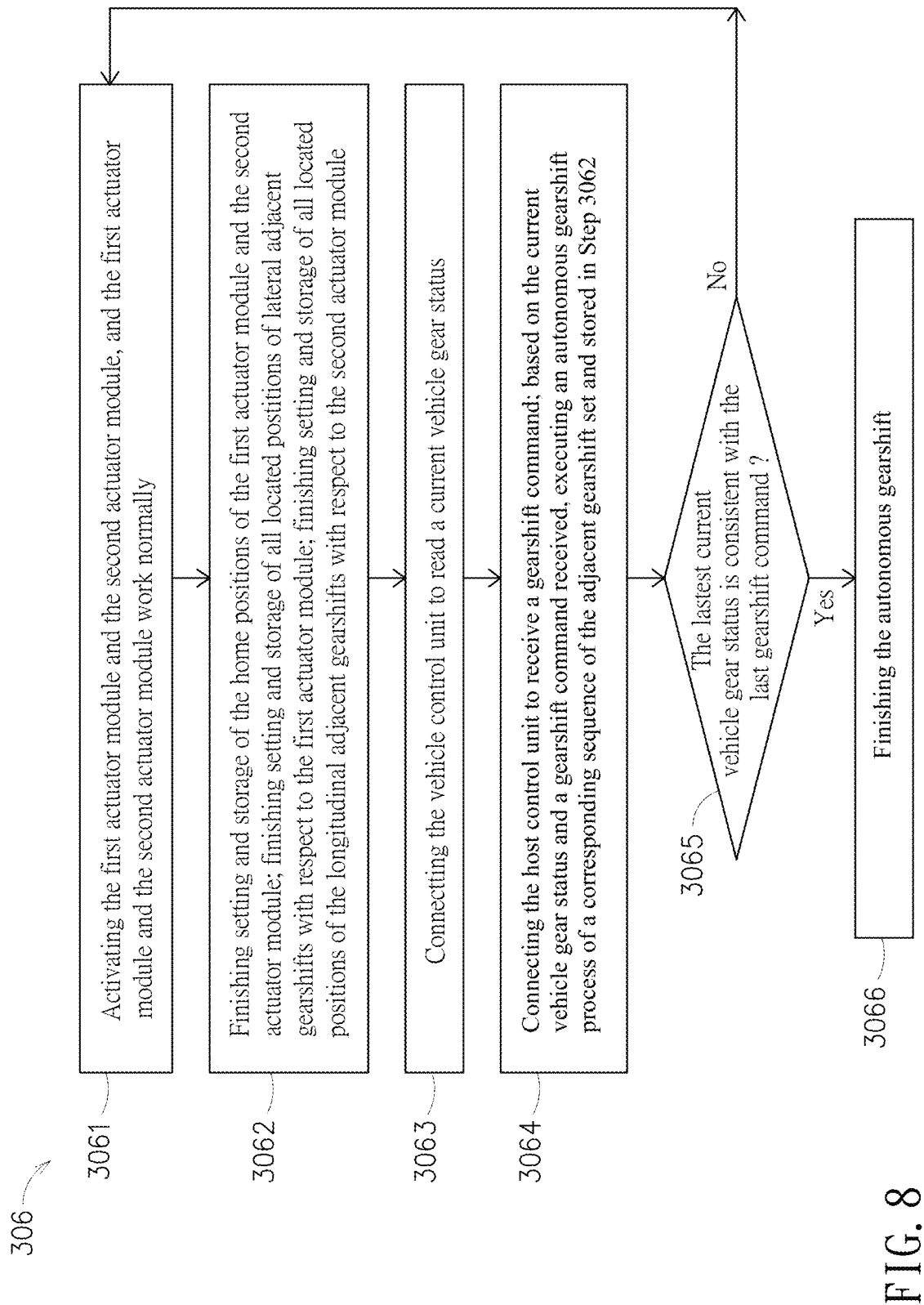
FIG. 8 is a flowchart diagram of implementation details for Step 306 in an embodiment of FIG. 7.

Referring to FIG. 1, FIG. 7 and FIG. 8, Step 306 of the process 300 in FIG. 7 is to implement the autonomous gearshift by the steps as follow.

Step 3061: Activating the first actuator module 11 and the second actuator module 21, and examining whether or not the first actuator module 11 and the second actuator module 21 work normally.

Step 3062: Finishing setting and storage of the home positions of the first actuator module and the second actuator module; finishing setting and storage of all located positions of lateral adjacent gearshifts with respect to the first actuator module; and, finishing setting and storage of the located positions of the longitudinal adjacent gearshifts with respect to the second actuator module.

Step 3063: Connecting the vehicle control unit 2 to read a current vehicle gear status. The vehicle control unit 2 gets the current vehicle gear status via the vehicle control network.

Step 3064: Connecting the host control unit 1 to receive a gearshift command; based on the current vehicle gear status and the gearshift command received, executing an autonomous gearshift process including located positions of the adjacent gearshift set and stored in Step 3062.

Step 3065: Determining whether or not the latest current vehicle gear status is consistent with the last gearshift command; if positive, executing Step 3066; and, if negative, executing Step 3061.

Step 3066: Finishing the automatic gearshift, and then executing Step 308 of process 300 in FIG. 7.

The aforesaid Steps 3061~3066 of the autonomous gearshift process, performed by the vehicle gearshift autonomous control device 100, are controlled by the electronic control unit 30 with respect to the gearshift command transmitted from the host control unit 1 and the current vehicle gear status read from the vehicle control unit 2. After finishing the autonomous gearshift, and the latest current vehicle gear status is consistent with the last gearshift command, then the autonomous gearshift process is finished.

Figure 9:
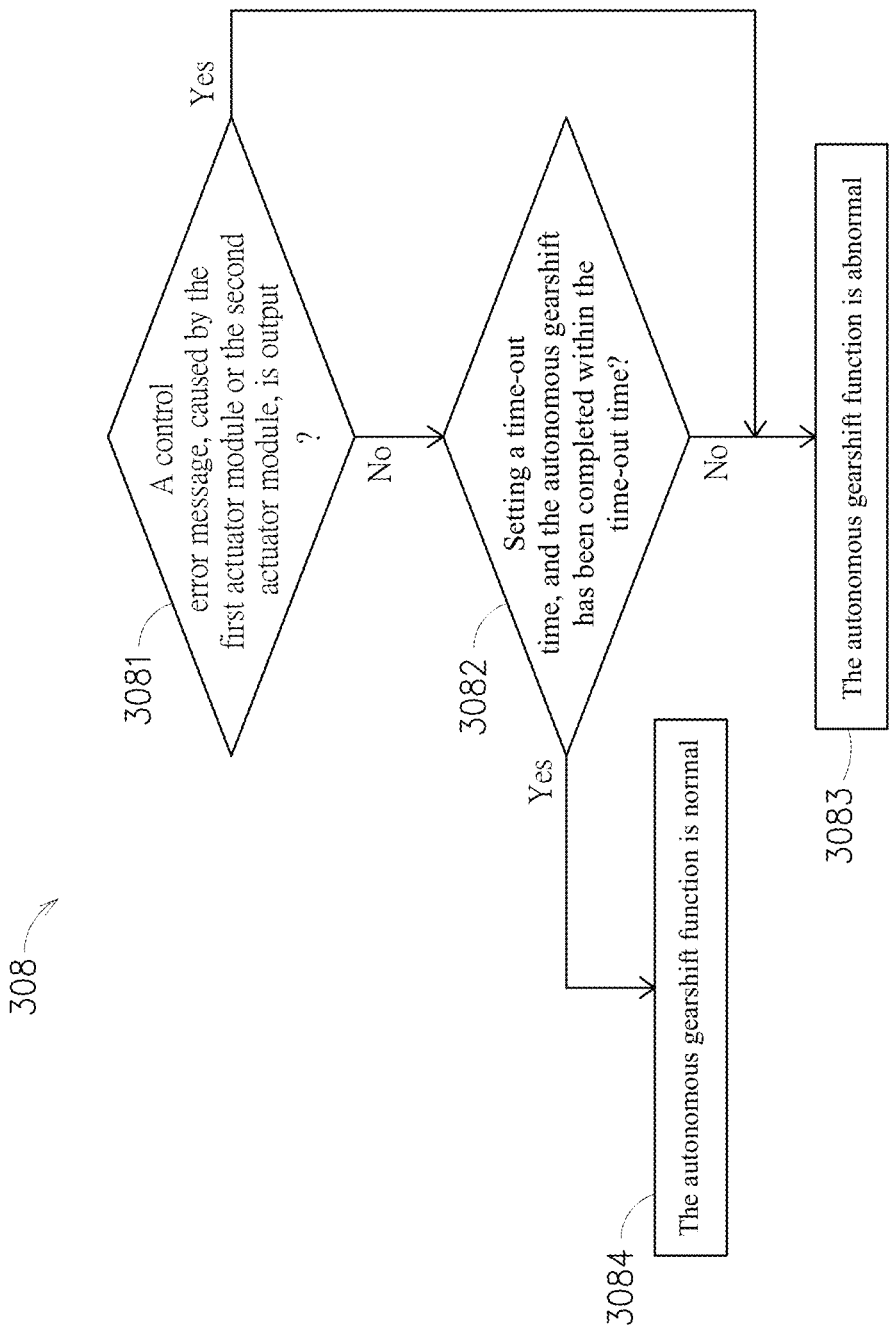
FIG. 9 is a flowchart diagram of implementation details for Step 308 in an embodiment of FIG. 7.

Referring to FIG. 1, FIG. 7 and FIG. 9, Step 308 of process 300 in FIG. 7 is to determine whether or not the autonomous gearshift is operated normally by the steps as follow.

Step 3081: Detecting whether or not a control error message, caused by the first actuator module 11 or the second actuator module 21, is output; if positive, executing Step 3083; and, if negative, executing Step 3082.

Step 3082: Setting a time-out time, and determining whether or not the autonomous gearshift has been completed within the time-out time; if positive, executing Step 3084; and, if negative, executing Step 3083.

Step 3083: Determining that the autonomous gearshift function is abnormal.

Step 3084: Determining that the autonomous gearshift function is normal.

Figure 10:
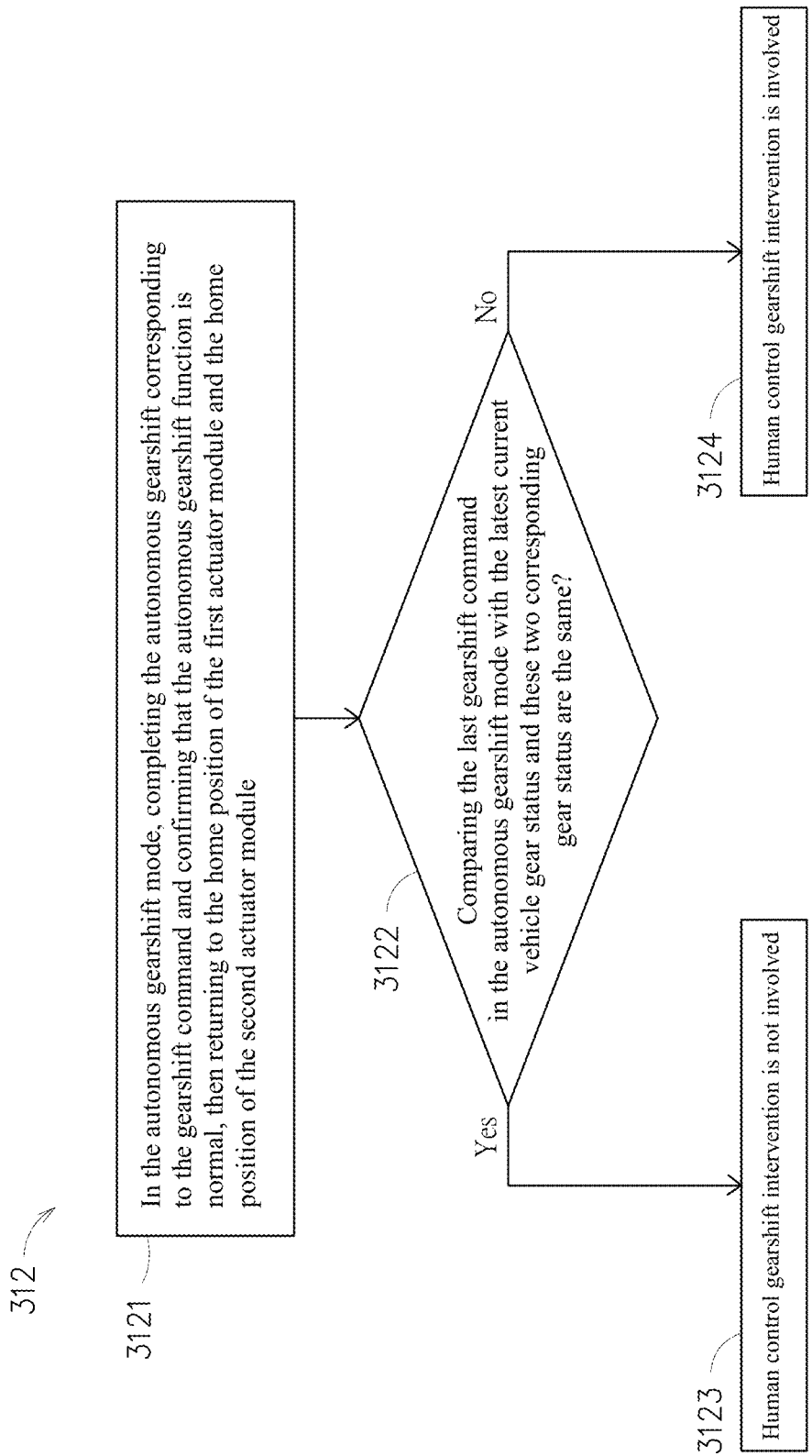
FIG. 10 is a flowchart diagram of implementation details for Step 312 in an embodiment of FIG. 7.

Referring to FIG. 1, FIG. 7 and FIG. 10, Step 312 of process 300 in FIG. 7 is to determine whether or not a human control gearshift intervention is detected while in the autonomous gearshift mode by the steps as follow.

Step 3121: In the autonomous gearshift mode, completing the autonomous gearshift corresponding to the gearshift command, and confirming that the autonomous gearshift function is normal; then returning to the home position of the first actuator module P10 and the home position of the second actuator module P20; and Step 3122: Comparing the last gearshift command in the autonomous gearshift mode with the latest current vehicle gear status, and determining whether or not these two corresponding gear statuses are the same; if positive, executing Step 3123; and, if negative, executing Step 3124.

Step 3123: Determining that the human control gearshift intervention is not involved.

Step 3124: Determining the human control gearshift intervention is involved.

These aforementioned FIG. 7~FIG. 10 fully illustrate that multiple examinations performed while executing the vehicle gearshift autonomous control method provided in this disclosure to ensure that the autonomous gearshift can be exactly executed and maintains the human control gearshift function. In the meantime, when the autonomous gearshift function is abnormal or a human control gearshift intervention is detected, the autonomous gearshift mode is immediately closed and then switched to the human control gearshift mode and the human control gearshift can be performed.

In summary, the vehicle gearshift autonomous control device and method thereof provided in this disclosure is used to combine with the shift lever device and the park lever of the gearbox that are used for human control gearshift control of conventional vehicle transmission, and provide actuator modules and electronic control means in add-on manner to retrofit the vehicle transmission with both autonomous and human control gearshift functions. Thereupon, a conventional vehicle transmission can be retrofitted with the autonomous gearshift function. In addition, with the device and method provided in this disclosure, the human control gearshift mode can be immediately switched to perform the human control gearshift for vehicle security function when the autonomous gearshift function is failed or a human control gearshift intervention in the autonomous gearshift mode is found. Thus, the retrofitted vehicle with shift-by-wire can integrate throttle-by-wire, brake-by-wire, steering-by-wire and relative sensors to provide drive-by-wire functions to assist for an autonomous parking/autonomous vehicle.

With respect to the aforementioned content, it is to be realized that the variations for the parts of the disclosure, including those in size, materials, shape, form, function and manner of operation, assembly and usage, are deemed readily apparent and obvious to one skilled in the art, and all equivalent relationships to those illustrated in the drawings and described in the specification are intended to be encompassed by the present disclosure.

What is claimed is:

1. A vehicle gearshift autonomous control device, comprising:
   a lateral gearshift autonomous device, comprising:
      a shift lever device, having a shift lever; and
      a first actuator module, configured to push the shift lever of the shift lever device in a direction parallel to a first direction of the shift lever device to allow the shift lever device to execute a lateral shift selection;
   a longitudinal gearshift autonomous device, comprising:
      a spin lever, configured to be spun to execute a longitudinal gearshift in a direction parallel to a second direction of the shift lever device; and
      a second actuator module, configured to spin the spin lever to execute the longitudinal gearshift in the direction parallel to the second direction of the shift lever device, the second direction and the first direction of the shift lever device being perpendicular to each other; and an electronic control unit, connected electrically with the first actuator module and the second actuator module; wherein, after an autonomous gearshift mode is chosen to be actuated, the electronic control unit is configured to execute a vehicle gearshift autonomous control method to drive the first actuator module to push the shift lever of the shift lever device in the direction parallel to the first direction of the shift lever device to execute the lateral shift selection, or to drive the second actuator module to spin the spin lever to execute the longitudinal gearshift in the direction parallel to the second direction of the shift lever device; wherein, when an abnormal autonomous gearshift function or a human control gearshift intervention is detected while in the autonomous gearshift mode, the electronic control unit is configured to shut off the autonomous gearshift mode and switch to a human control gearshift mode to perform a human control gearshift.

2. The vehicle gearshift autonomous control device of claim 1, wherein the first actuator module includes:
   a shift lever auxiliary mechanism, combined and assembled with the shift lever device;
   a first motor module, assembled with the shift lever auxiliary mechanism, configured to drive the shift lever auxiliary mechanism to move the shift lever of the shift lever device to perform the lateral shift selection; and
   a first position motor driver, connected electrically with the first motor module.

3. The vehicle gearshift autonomous control device of claim 2, wherein the shift lever auxiliary mechanism includes:
   a slider base, having a slider base opening;
   a levering slider, disposed with the slider base to slide on the slider base; and
   a link bar, connected between the levering slider and the first motor module, wherein the first motor module is configured to drive the link bar to move the levering slider to slide linearly along the slider base to push the shift lever to execute the lateral gearshift.

4. The vehicle gearshift autonomous control device of claim 3, wherein the levering slider has a levering slider opening corresponding to a shift lever slot of the shift lever device in shape and size, and the shift lever is arranged within the levering slider opening of the levering slider; wherein, after the levering slider is moved to overlap the levering slider opening with the shift lever slot of the shift lever device and align each other, the shift lever is configured to execute the human control gearshift without any interference by the levering slider; wherein, while the levering slider slides along the slider base, then the shift lever is pushed along a sliding direction by right and left inner edges opposite in the levering slider opening of the levering slider thereof to execute the lateral shift selection.

5. The vehicle gearshift autonomous control device of claim 1, wherein the electronic control unit is connected electrically with a host control unit and a vehicle control unit, is configured to receive a gearshift command from the host control unit, and is configured to receive a current vehicle gear status from the vehicle control unit.

6. The vehicle gearshift autonomous control device of claim 1, wherein the second actuator module includes:
   a spin lever auxiliary mechanism, combined and assembled with the spin lever;
   a second motor module, assembled with the spin lever auxiliary mechanism, configured to drive the spin lever auxiliary mechanism to spin the spin lever to execute the longitudinal gearshift; and
   a second position motor driver, connected electrically with the second motor module.

7. The vehicle gearshift autonomous control device of claim 6, wherein the spin lever auxiliary mechanism includes:
   a park auxiliary lever, combined with the spin lever, configured to be moved and used to lever to further spin the spin lever;
   a levering plate, configured to move the park auxiliary lever; and
   a push-pull cable, connected between the levering plate and a linear motion mechanism and configured to extend the linear motion mechanism to mount in a proper place of the vehicle, configured to be linearly driven by the linear motion mechanism to move and further push and pull the levering plate; and
   the linear motion mechanism, combined with the second motor module, configured to be driven by the second motor module to move linearly.

8. The vehicle gearshift autonomous control device of claim 7, wherein the levering plate has a levering plate slot, and the end of the park auxiliary lever is disposed perpendicularly inside the levering plate slot to be levered by the levering plate; wherein the slot length is substantially equal to a sliding stroke that the end of the park auxiliary lever slides in the levering plate slot during performing the human control gearshift; wherein the levering plate is configured to be moved to pull and push the park auxiliary lever by a front-end inner edge and a rear-end inner edge of the levering plate slot, and thus to spin the spin lever to execute the longitudinal gearshift.

* * * * *